Patented June 3, 1924.

1,496,735

UNITED STATES PATENT OFFICE.

BENJAMIN PARKER, OF LEBAM, WASHINGTON.

POLISHING COMPOSITION.

No Drawing.      Application filed August 21, 1922. Serial No. 583,367.

*To all whom it may concern:*

Be it known that I, BENJAMIN PARKER, a citizen of the United States, residing at Lebam, in the county of Pacific and State of Washington, have invented certain new and useful Improvements in a Polishing Composition, of which the following is a specification.

This invention relates to a new and useful composition of matter to be used as an automobile and furniture polish, and it consists in the ingredients hereinafter named, mixed in the manner described.

An object of my invention is to provide a polish which when applied will clean the surface and leave the latter in a polished condition and which will also tend to render the varnish or paint more plastic and less liable to crack.

A further object of my invention is to provide a polish which flows readily and which will therefore cover a large amount of surface for a given quantity as distinguished from the heavier polishes which tend to leave the article in tacky or otherwise abnormal condition.

A still further object of my invention is to provide a polish which does not require excessive rubbing to bring out the luster.

The invention has for a still further object to provide a polish for automobiles and furniture which when properly used will produce a highly polished glossy surface, and which will not be greasy or sticky.

Other objects and advantages will appear in the following specification and the novel features of the invention will be particularly pointed out in the appended claim.

The body of the composition comprises raw linseed oil, turpentine, apple vinegar, and "listerine."

I find by using the following proportions renders the desired result, as an example, raw linseed oil three and one-half pints, turpentine two pints, apple vinegar two pints and "listerine" one-half pint.

Listerine as commercially on the market, is produced from a formula including the following: thyme, eucalyptus, baptisia, gaultheria, mentha, boric and benzoic acid, rectified spirits and water.

Having thus described my invention what I claim as new, and desire to secure by Letters Patent of the United States, is as follows:

A polishing composition comprising raw linseed oil, three and one-half pints, turpentine two pints, apple vinegar two pints, and "listerine" one-half pint.

In testimony whereof I affix my signature.

BENJAMIN PARKER.